US010311988B2

(12) United States Patent
Waisanen et al.

(10) Patent No.: US 10,311,988 B2
(45) Date of Patent: Jun. 4, 2019

(54) CASK HANDLING SYSTEM AND METHOD

(71) Applicant: MHE Technologies, Inc., Wilmington, DE (US)

(72) Inventors: Steven K. Waisanen, Big Bend, WI (US); Joe Yustus, Hartford, WI (US)

(73) Assignee: MHE Technologies, Inc., Wilmington, DE (US)

( * ) Notice: Subject to any disclaimer, the term of this patent is extended or adjusted under 35 U.S.C. 154(b) by 0 days.

(21) Appl. No.: 15/818,303

(22) Filed: Nov. 20, 2017

(65) Prior Publication Data

US 2018/0075934 A1    Mar. 15, 2018

Related U.S. Application Data

(63) Continuation of application No. 13/497,737, filed as application No. PCT/US2010/050397 on Sep. 27, 2010, now Pat. No. 9,824,781.

(60) Provisional application No. 61/245,881, filed on Sep. 25, 2009.

(51) Int. Cl.
*G21C 19/32* (2006.01)
*G21C 19/00* (2006.01)
*G21C 19/18* (2006.01)
*G21F 5/14* (2006.01)

(52) U.S. Cl.
CPC .............. *G21C 19/32* (2013.01); *G21C 19/00* (2013.01); *G21C 19/18* (2013.01); *G21F 5/14* (2013.01)

(58) Field of Classification Search
CPC ........... G21F 5/14; G21F 5/008; G21C 19/32; G21C 19/18; B66C 19/02; B66C 1/14; B66C 1/66
See application file for complete search history.

(56) References Cited

U.S. PATENT DOCUMENTS 3,910,006 A * 10/1975 James .................... G21C 19/18
                                                            376/261
4,704,539 A * 11/1987 Dequesnes ................ G21F 5/14
                                                            105/238.1

FOREIGN PATENT DOCUMENTS

WO    WO-2009055795 A1 *  4/2009  ............. B66C 17/00

* cited by examiner

*Primary Examiner* — Glenn F Myers
(74) *Attorney, Agent, or Firm* — Porter Wright Morris & Arthur LLP

(57) ABSTRACT

A system and method for removing spent fuel assemblies from a fuel building and transporting them to on-site facilities. A cask transporter is moved into the fuel building with an empty spent fuel storage cask, spent fuel assemblies are loaded into spent fuel storage cask, the cask is sealed, and the cask transporter moves the loaded spent fuel storage cask to a handling area for final disposal. Components of the system include a penetration cover, a lifting mechanism, a control system, a valve system, and the cask transporter.

19 Claims, 16 Drawing Sheets

Transporter turning about a point 100 feet to the left of the centerline

Transporter turning about a point 25 feet to the left of the centerline

Transporter turning about a point 92 inches to the left of the centerline right at the tire line Transporter turning about a point at the centerline of the machine and cask "counter-rotating"

CASK HANDLING SYSTEM AND METHOD

RELATED APPLICATIONS

This Application is a continuation of U.S. patent application Ser. No. 13/497,737 filed on Nov. 5, 2012, now U.S. Pat. No. 9,824,781, which is a national phase application of International Application Number PCT/US2010/50397 filed on Sep. 27, 2010, which claims the priority benefit of U.S. provisional Patent Application No. 61/245,881 filed on Sep. 25, 2009, the disclosures of which is expressly incorporated herein in its entirety by reference.

FIELD OF THE INVENTION

The present invention generally relates to systems and methods for handling massive containers and, more particularly, handling storage casks for nuclear waste material.

BACKGROUND OF THE INVENTION

Nuclear power plants are required to have systems and methods for removing spent nuclear fuel from the plants so that it can be stored and/or processed. The spent nuclear fuel is typically stored in casks. While the current systems and methods may handle the casks, they have a number of problems. Existing systems have little documentation, require significant man hours, and use out-dated technology. These current methods also require a relatively large number of single use components that makes these systems expensive and difficult to maintain. Accordingly, there is a need in the art for improved systems and methods for handling casks containing nuclear waste material.

SUMMARY OF THE INVENTION

The present invention provides a system and method that overcomes at least some of the issues of the related art. Disclosed is a method for removing spent nuclear fuel comprising the steps of moving a cask below a penetration using a transporter, raising the cask from the transporter using a handling mechanism engaging only upper trunnions of the cask so that the cask self-aligns with the penetration using gravity, securing the cask to the penetration, inserting the spent fuel into the cask, unsecuring the cask from the penetration, and lowering the cask onto the transporter using the handling mechanism.

Also disclosed is an upper handling mechanism for handling a sent nuclear fuel cask having pairs of upper and lower trunnions. The mechanism comprises, in combination, a fixed position frame, a tool movable in the vertical direction relative to the frame, a plurality of hydraulic cylinders for vertically moving the tool relative to the frame, and a pair of paddles pivotably attached to the tool for selectively engaging the upper trunnions of the cask.

Also disclosed is a method for removing spent nuclear fuel comprising the steps of moving a cask below an opening at a first station using a self-powered transporter, rotating the cask from a horizontal orientation to a vertical orientation at the first station, moving the cask below hoist at a second station using the self-powered transporter, moving the cask below a penetration at a second station using the self-powered transporter, raising the cask from the self-powered transporter to the penetration, securing the cask to the penetration, inserting the spent fuel into the cask, unsecuring the cask from the penetration, and lowering the cask onto the self-powered transporter.

Further disclosed is a self-powered vehicle for transporting a spent nuclear fuel cask having pairs of upper and lower trunnions. The vehicle comprises, in combination, a body, an upender secured to the body for holding the cask and moving the cask between vertical and horizontal orientations, and a plurality of independently driven and independently steered wheels on each lateral side of the body.

From the foregoing disclosure and the following more detailed description of various preferred embodiments it will be apparent to those skilled in the art that the present invention provides a significant advance in the technology of systems and methods for spent nuclear fuel removal. Particularly significant in this regard is the potential the invention affords for providing an, reliable and effective system and method for handling spent nuclear fuel casks. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
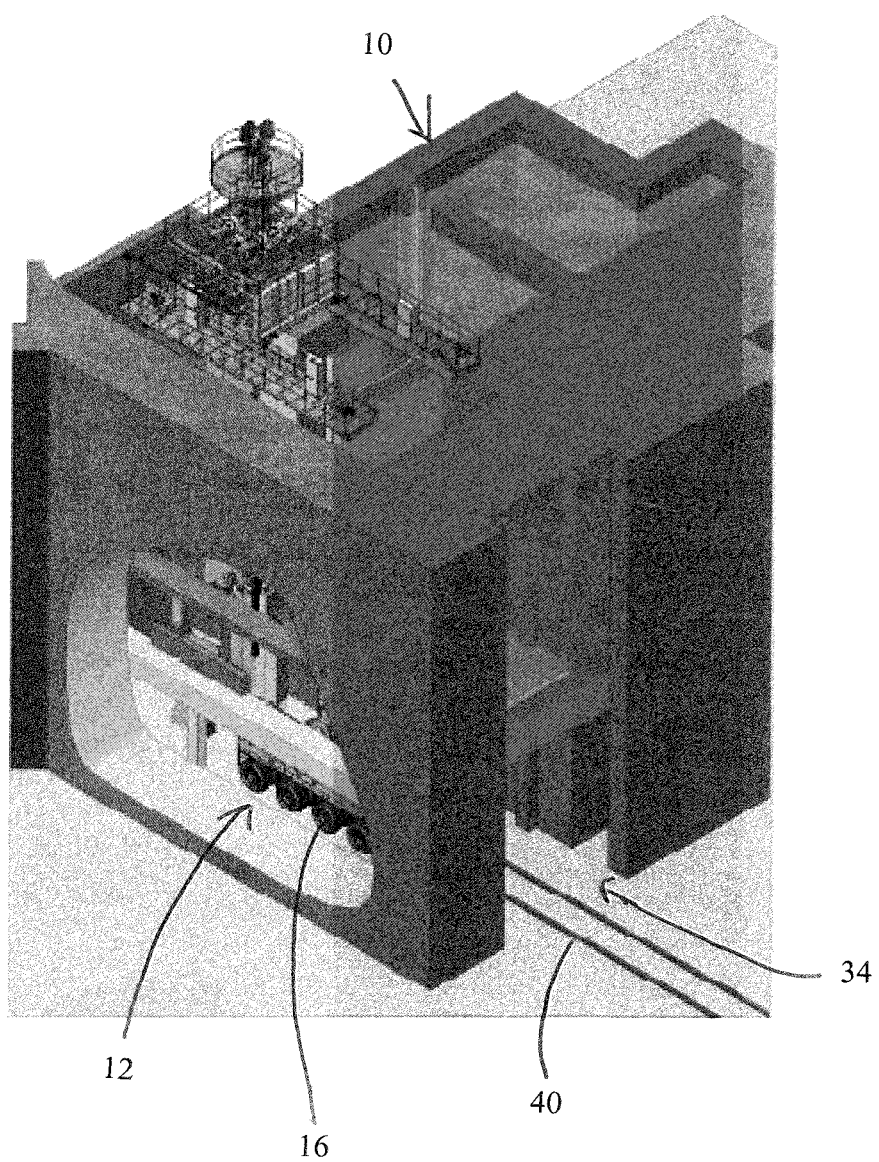
FIG. 1 is a perspective view of fuel building or facility having a cast transfer system according to the present invention.
Figure 2:
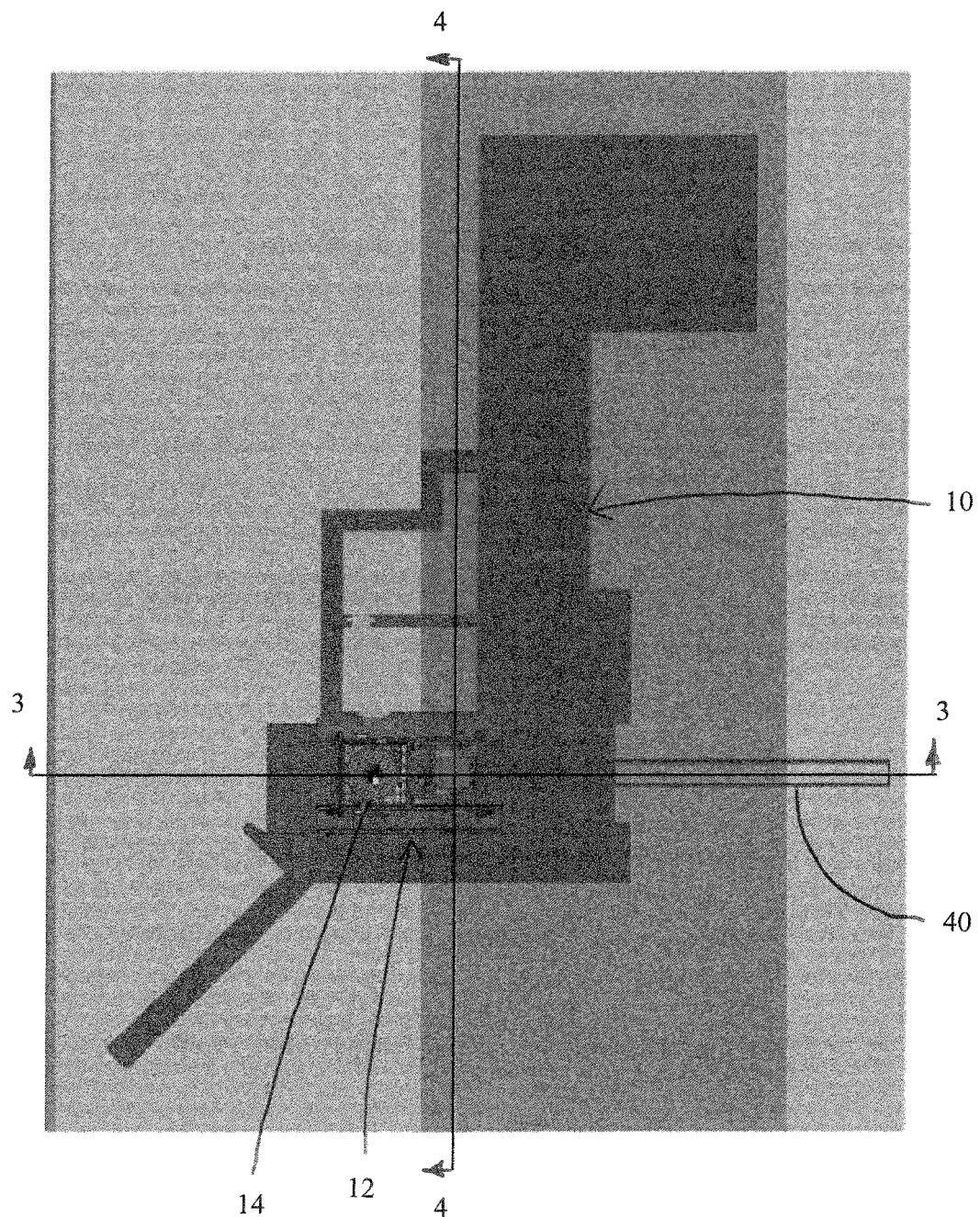
FIG. 2 is a plan view of the cask transfer assembly of FIG. 1.
Figure 3:
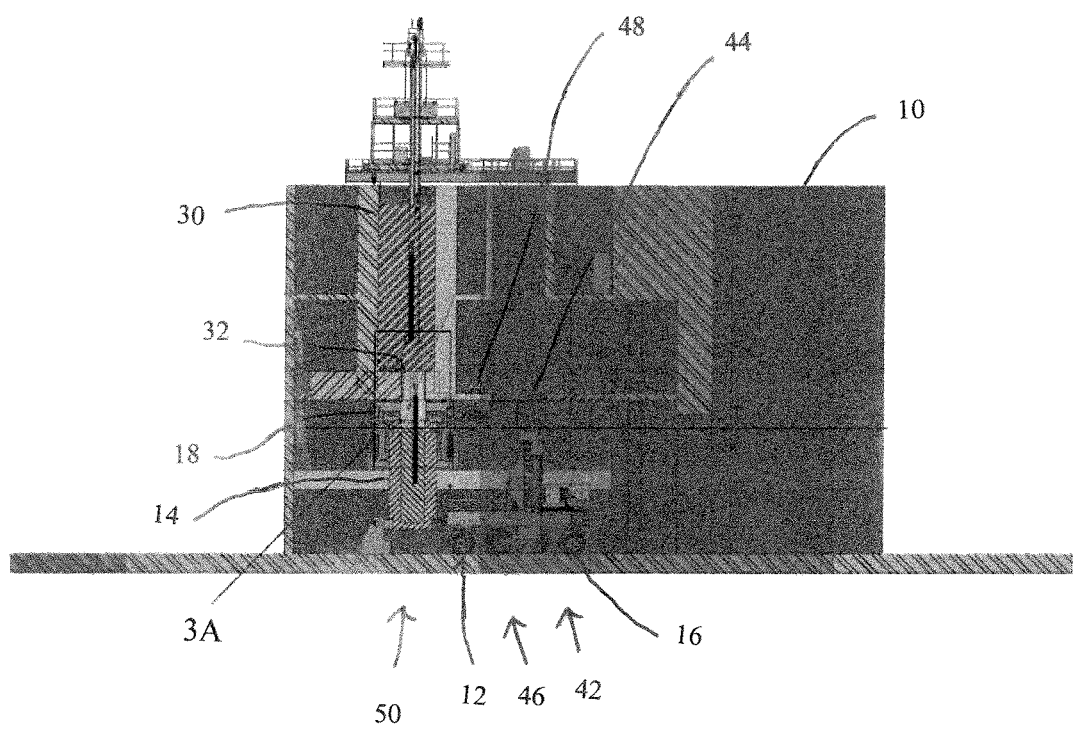
FIG. 3 is a sectional view taken along line 3-3 of FIG. 2.
Figure 3A:
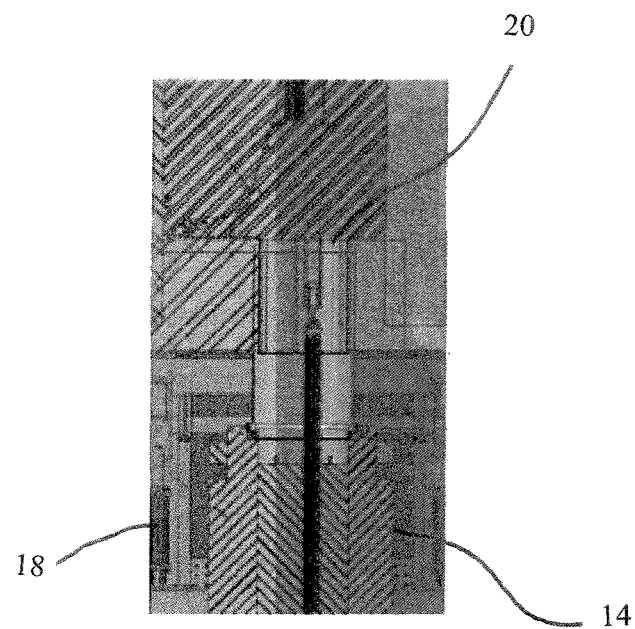
FIG. 3A is an enlarged, fragment view showing a portion of FIG. 3.
Figure 4A:
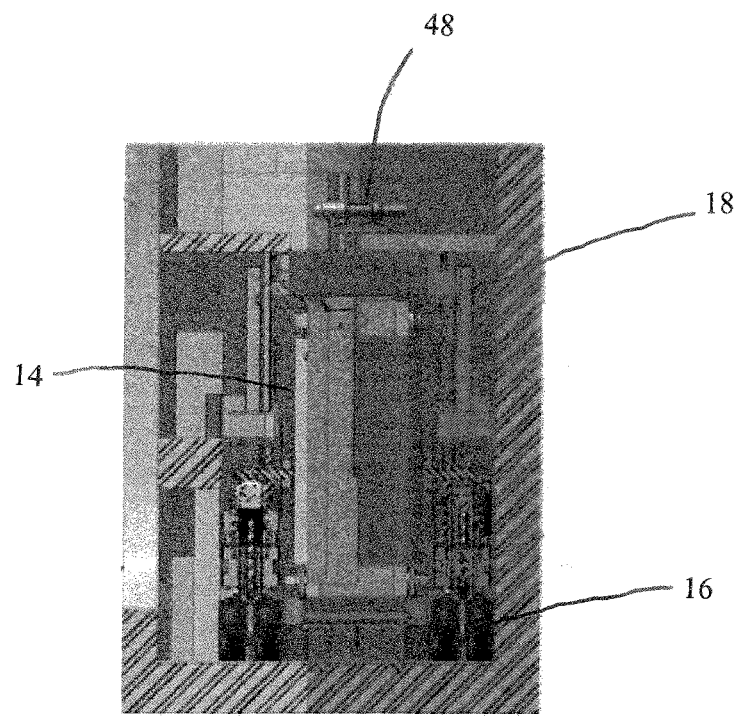
FIG. 4A is an enlarged, fragment view showing a portion of FIG. 4.
Figure 4:
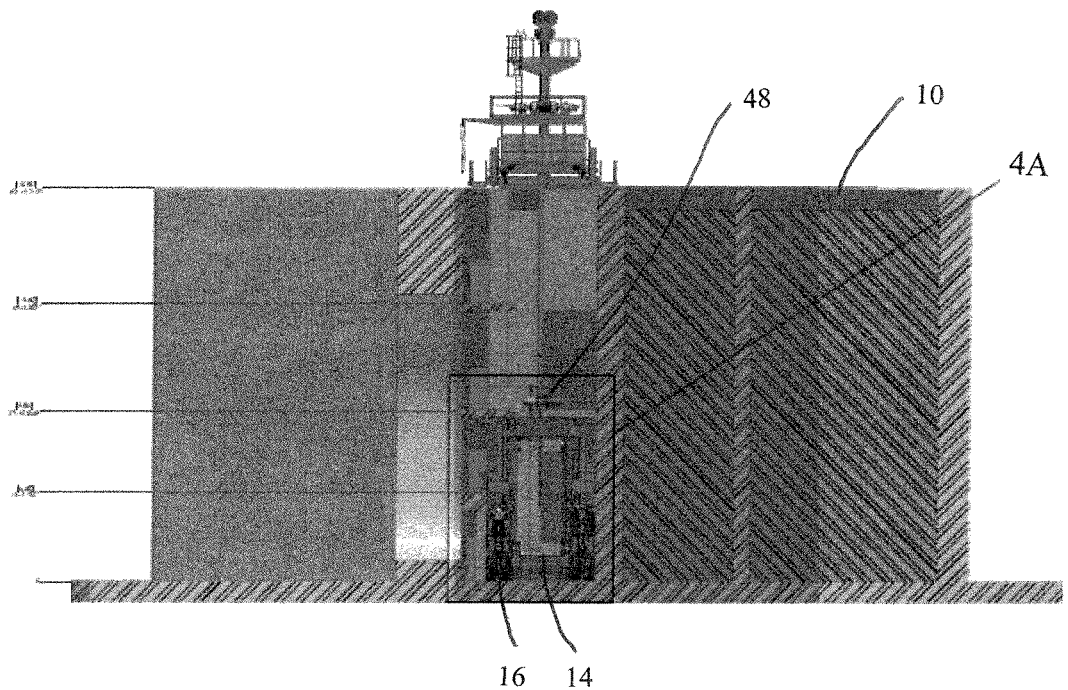
FIG. 4 is a sectional view taken along line 4-4 of FIG. 2.
Figure 5:
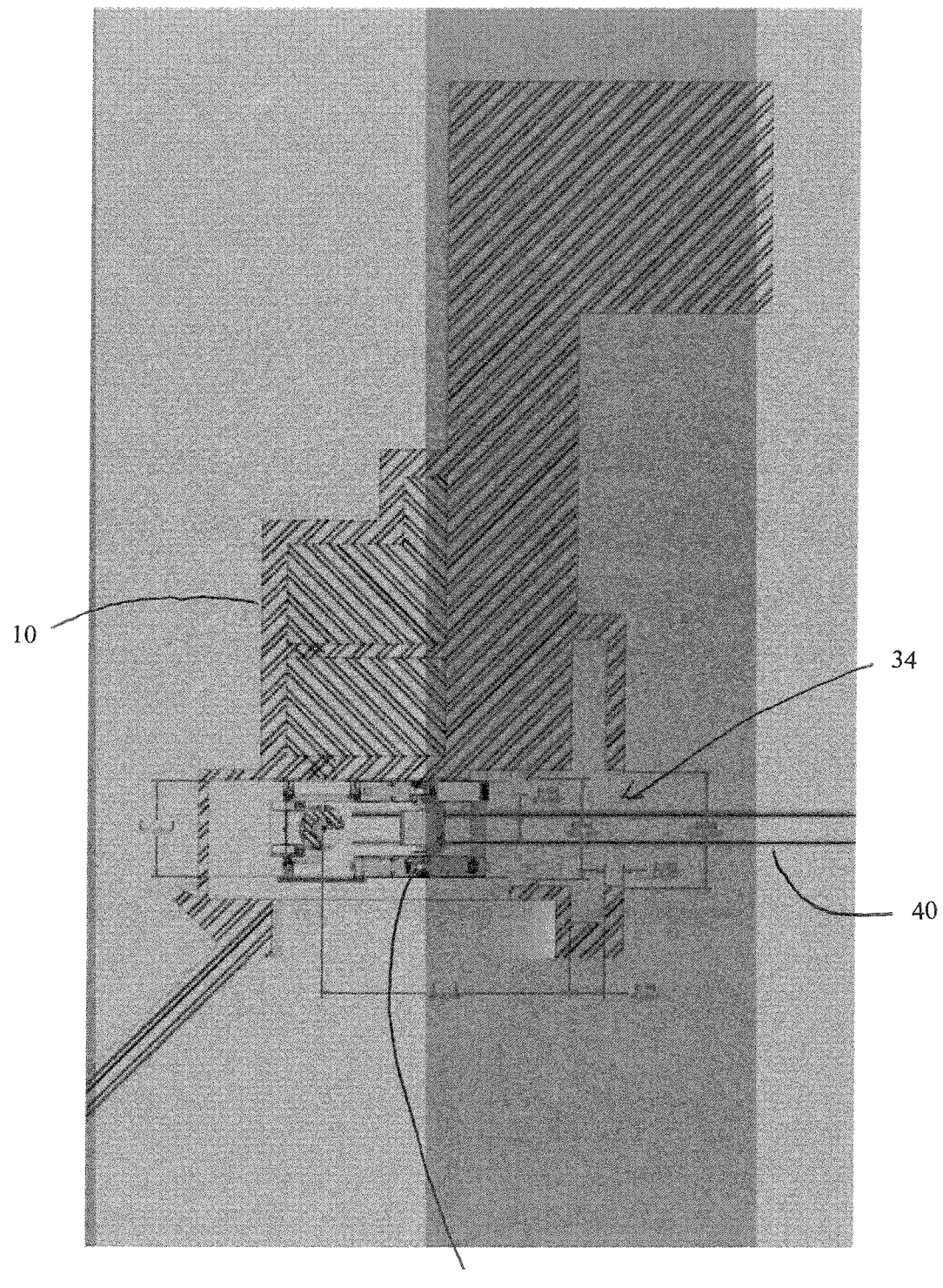
FIG. 5 is a sectional view taken along line 5-5 of FIG. 4.

It should be understood that the appended drawings are not necessarily to scale, presenting a somewhat simplified representation of various preferred features illustrative of the basic principles of the invention. The specific design features of the cask handling system as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the cask handling system illustrated in the drawings. In general, up or upward refers to an upward direction within the plane of the paper in FIG. 3 and down or downward refers to a downward direction within the plane of the paper in FIG. 3.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved systems and methods disclosed herein. The following detailed discussion of various alternative and preferred embodiments will illustrate the general principles of the invention with reference to preferred embodiments. Other embodiments suitable for other applications will be apparent to those skilled in the art given the benefit of this disclosure.

Referring now to the drawings, FIGS. 1 to 5 illustrate a fuel building 10 having a fuel transfer or cask handling system according to the present invention 12. The illustrated cask handling system 12 handles a spent fuel storage cask 14 through the process of removing spent nuclear fuel from the fuel building 10 including providing an unloaded cask 14, preparing and opening the cask 14, loading spent fuel into the cask 14, sealing the cask 14, and removing the loaded cask 14 from the fuel building 10. The cask handling system 12 includes a self-powered mobile cask handling vehicle or cask transporter 16, an upper handling mechanism 18, a penetration cover 20, a seismic restraint 22, and a valve system 24.

A preferred method according to the present invention for removing spent fuel assemblies from a fuel building 10 and transporting them to on-site facilities for the next stage of disposal is as follows. First, a complete empty cask 14 is placed onto the cask transporter 16 in the horizontal or vertical orientation by an overhead gantry crane. The cask 14 is securely attached to an upender structure 26 of the cask transporter 16 which can pivot the cask 14 about a horizontal and laterally extending pivot axis 28 so that the cask 14 can be moved between horizontal and vertical positions. Precise positioning of the cask 14 onto the cask transporter 16 is not necessary because locating the cask 14 with respect to a fuel pool 30 and penetration 32 in the building 10 is accomplished by the other equipment as described hereinafter.

With the cask 14 positioned in its horizontal position, the cask transporter 16 drives to the fuel building 10. The cask transporter 16 has the ability to drive anywhere on site and can be operated by an on-board driver or by radio remote control. The cask transporter 16 has a hydraulic power system that is powered by a self-contained motor and generator 36 (no external tractor or tugger is required). When inside the cask transfer facility 10, the cask transporter 16 has the ability to run on remote power via an umbilical cord. The cask transporter 16 enters a cask loading hall or fuel hall 34 of the fuel building 10 and aligns itself with a pair of parallel, embedded floor rails 40. When the cask transport 16 is aligned with the imbedded floor rails 40 and completely with the cask loading hall 34, isolation doors are shut and temporary power is connected to the cask transporter 16 via the umbilical cord. Because the cask transporter 16 is aligned with the rails 40, side-to-side or lateral positioning of the cask transporter 16 is automatically accomplished and precise positioning from front to back in a linear direction within the cask loading hall 34 can be obtained.

The upender 26 on the cask transporter 16 repositions the cask from its traveling horizontal position to its vertical position, engages upper seismic constraints, and positions the cask 14 under a first processing station which is the cask prep station 42. At the first station 42, a shock absorbing cover, protection lid, and fixing flange of the cask 14 are each manually removed using an auxiliary crane located in the fuel building 10. Personnel are located above the fuel hall 34 and access the cask 14 through a hole 44 in the floor. This provides a controlled and safe work area for removing the covers and lids from the cask 14. The cask components are stored on sliding shelves located adjacent the hole 44. Once bolts for the biological lid of the cask 14 have been removed, the cask transporter 16 is moved by radio control to the second station which is the biological lid station 46.

At the second station 46, a hoist 48 with a grapple device is manually operated, aided with cameras, to maneuver the grapple to engage and remove the biological lid of the cask 14. With the biological lid moved out of the way, a thorough visual inspection of all seals and sealing surfaces of the cask 14 is conducted by an operator using cameras. Redundant piping and hosing is connected into ports of the cask 14 at this time. The cask transporter 16 is then moved by radio control to the third station which is the cask loading station 50.

At the third station 50, the cask transporter 16 locates the cask 14 under the penetration 32 of the fuel pool 30 and personnel disconnect the cask 14 from the cask transporter 16. In this position, the cask is located under the upper handling mechanism 18.

Hydraulically powered paddles 52 of the upper handling mechanism 18 have key slots 54 which are extended and slide over upper trunnions 56 of the cask 14 to lock the cask 14 to the upper handling mechanism 18. With the cask 14 securely held by the paddles 52, the cask transporter 16 is backed away and a vertical guide system or seismic restraint 22 rises from the floor and engages lower trunnions 58 of the cask 14. As the cask 14 is raised by the upper handling mechanism 18 from the cask transporter 16, the lower trunnions 58 engage a keyed structure 60 in the vertical guide system 22, preventing a swinging pendulum motion in a seismic event. The cask 14 is lifted up by the upper handling mechanism 18 and proper alignment of mating surfaces is visually verified using cameras. A multi-stage redundant bladder system engages an inner face of the cask opening. Mechanical locking means engage and the paddles 52 locate the cask 14 in alignment (similar to a plumb bob) using gravity. The redundant bladder system is then inflated to secure the seal. After successful docking of the cask 14, the penetration 32 is filled with borated or de-mineralized water. Using vent and drain valves, the cask 14 is filled with water and pressure is equalized on the two sides of the penetration upper cover 20. At this time, all personnel are exited from the loading hall 34.

The penetration upper cover 20 is opened and remains opened and monitored by cameras as spent fuel is loaded into the cask 14. As the cask has been loaded with spent fuel and the cameras verify that the spent fuel bundles are located properly, the penetration upper cover 20 is closed. The area below the penetration upper cover 20 is drained, rinsed with de-mineralized water and allowed to dry. The water in the cask is lowered to the necessary level for the biological lid. The cask transporter 16 is then moved back to the cask loading station, the bladder seals are depressurized and the cask 16 is lowered from the seal and onto the cask transporter 16. The paddles 52 retract from the cask 14 and mechanical means secure the cask to the cask transporter 16. The cask transporter 16 then moves the cask 14 back to the biological lid station 46 where the biological lid is placed back onto the cask 14 and the remaining cask restraints are secured. Personnel are then allowed back into the loading hall 34.

Redundant piping and hosing is disconnected from the cask ports and all ports are properly sealed. The cask transporter 16 then moves the cask 14 back to the cask prep station 42. Remaining cask components are reassembled and properly engaged on the cask 14. Remaining cask constraints are secured and the cask 14 is down ended to its horizontal orientation. Radiological tests are performed and decontamination is performed as necessary. The doors in the loading hall 34 are opened and temporary power to the cask transporter is removed, that is, the umbilical cord is removed. The cask transporter 16 then drives out of the fuel building 10 under its own power. The cask transporter 16 takes the cask 14 to a handling area for final disposal.

Figure 6:
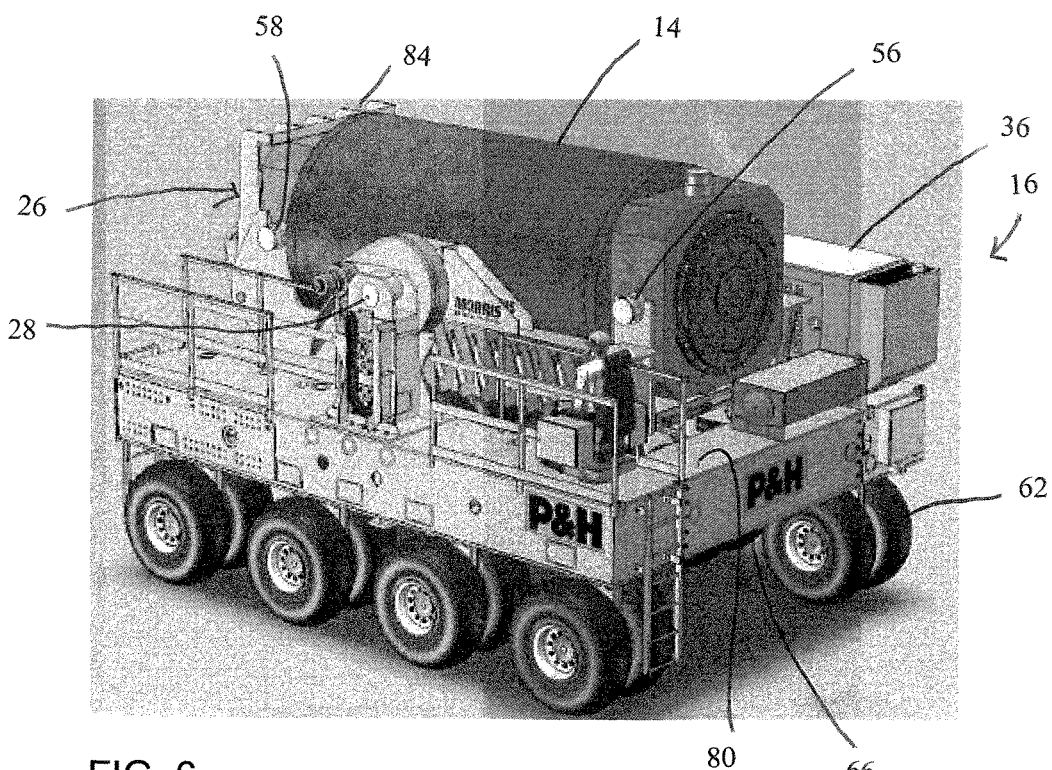
FIG. 6 is a perspective view of a cask transporter of the cask handling system of FIGS. 1 to 5, wherein the cask is held in a horizontal orientation.
Figure 7:
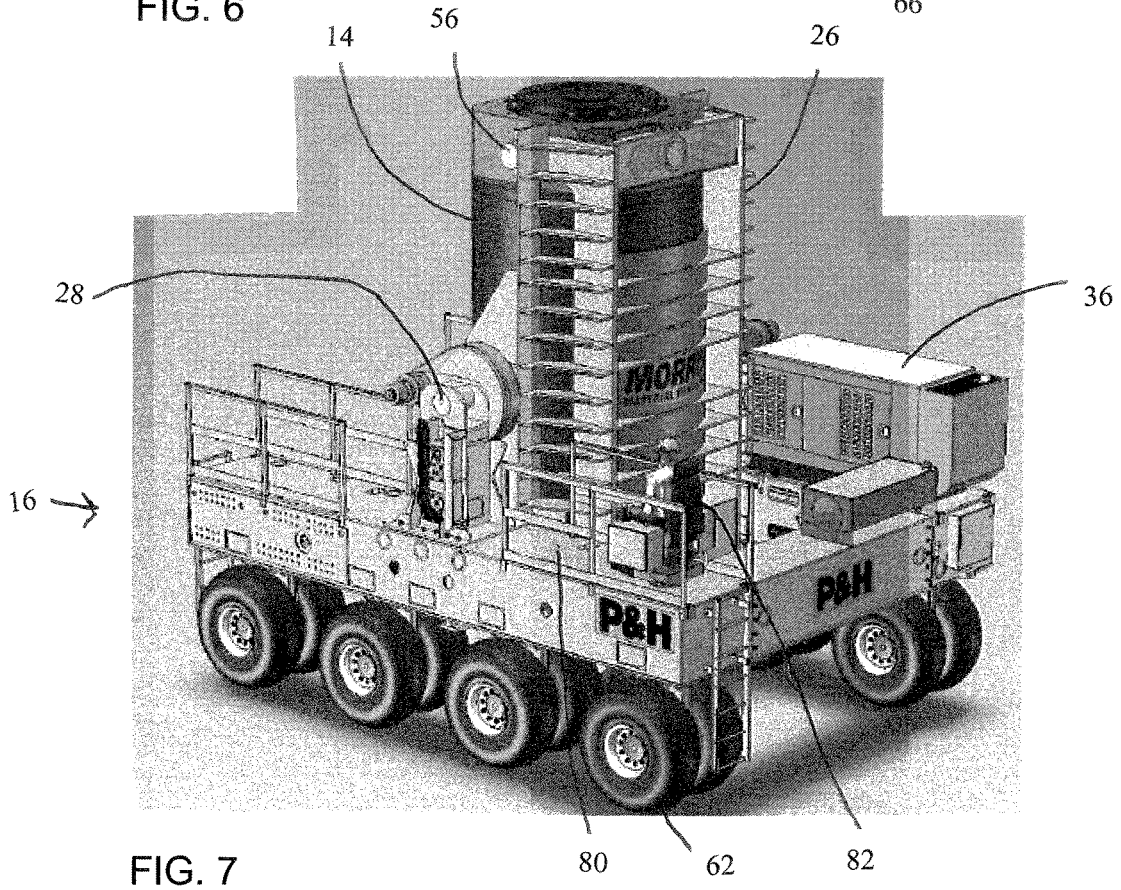
FIG. 7 is a perspective view of the cask transporter of FIG. 6, wherein the cask is held in a vertical orientation.
Figure 8:
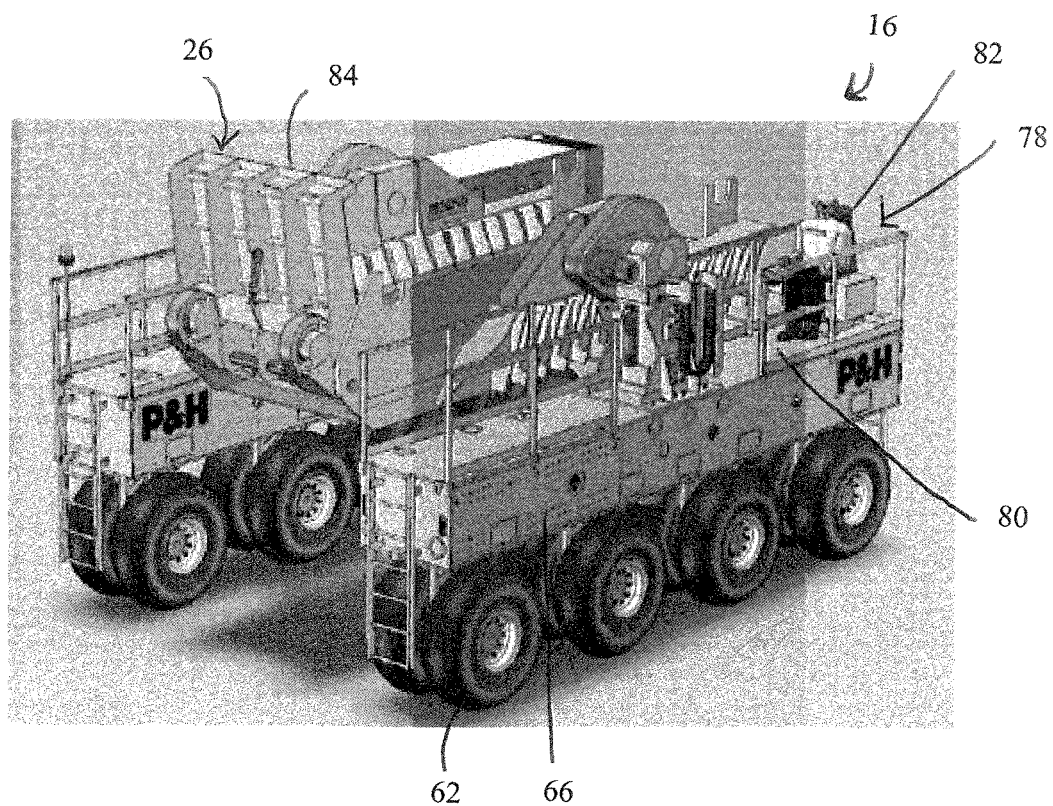
FIG. 8 is a perspective view of the cask transporter of FIGS. 6 and 7, wherein an upender is in a horizontal orientation without holding a cask.
Figure 9:
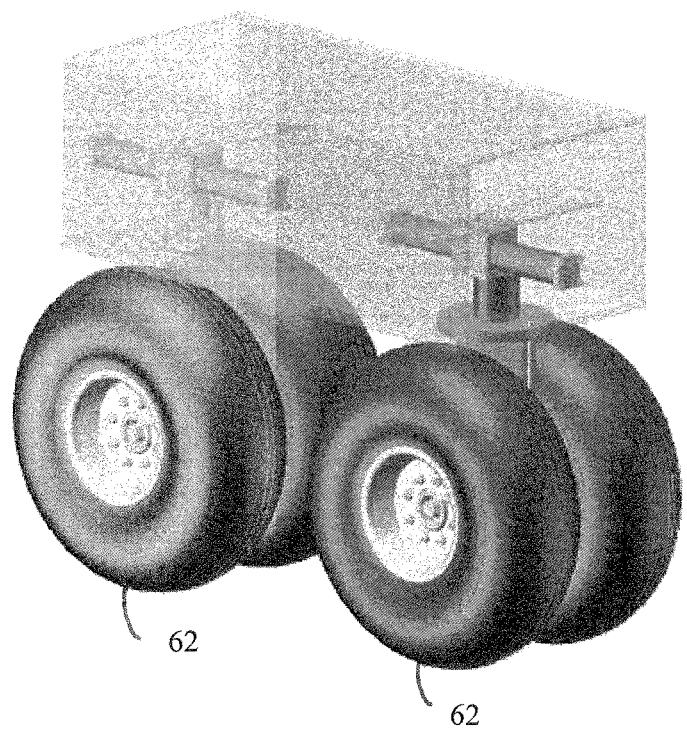
FIG. 9 is perspective view of a tire propulsion/support system of the cask transporter of FIGS. 6 to 8.
Figure 10:
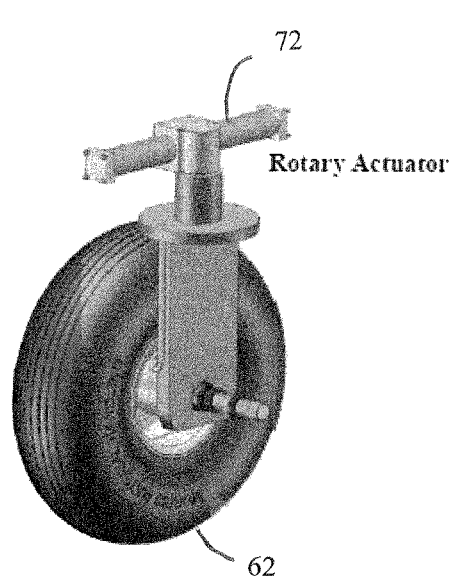
FIG. 10 is a perspective view of a rotary actuator of the tire propulsion/support system of FIG. 9.
Figure 11:
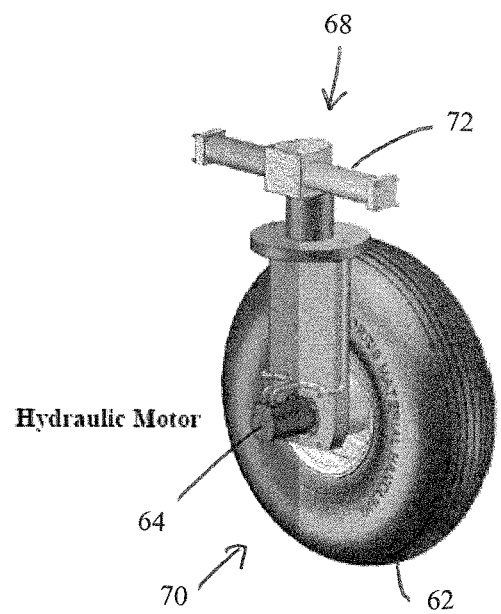
FIG. 11 is a perspective view of a hydraulic motor of the tire propulsion/support system of FIG. 9.
Figure 12:
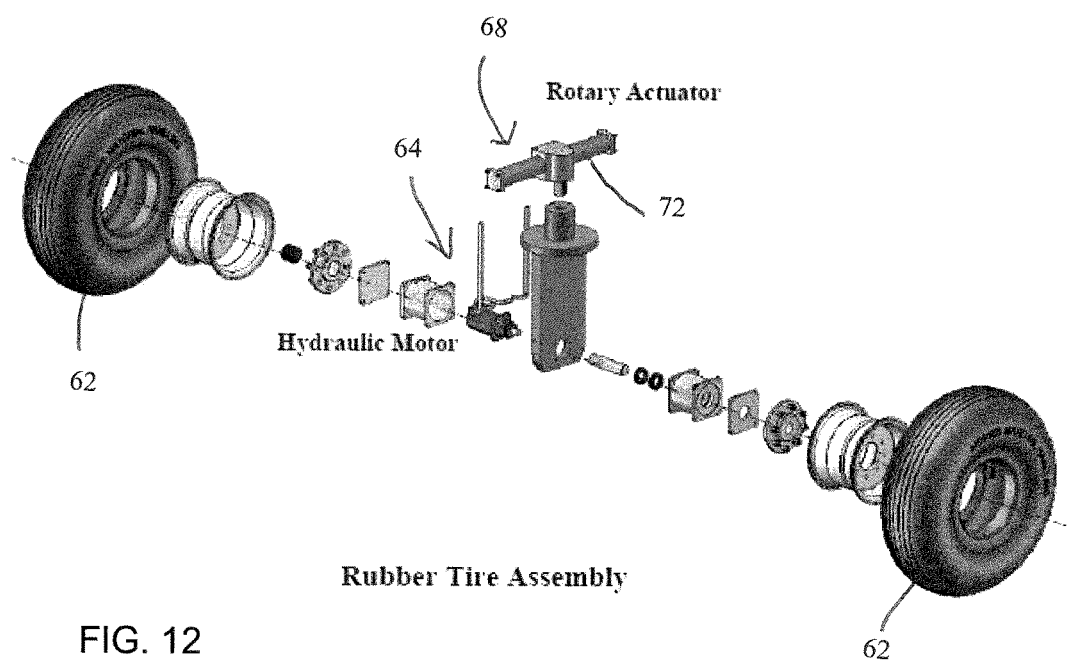
FIG. 12 is a perspective view of a tire assembly of the tire propulsion/support system of FIG. 9.
Figure 13A:
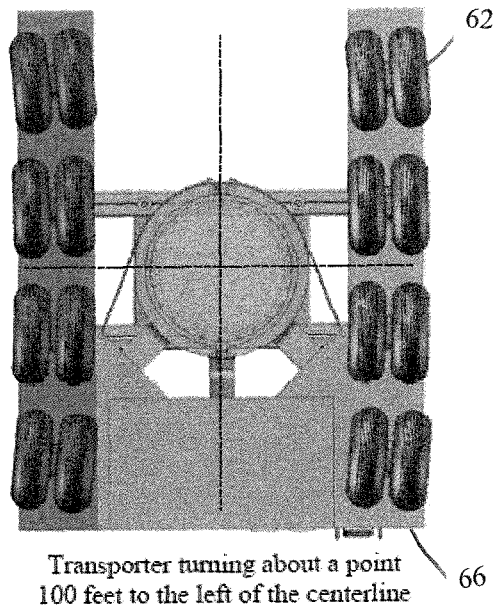
FIGS. 13A to 13D are bottom plan views of the cask transporter of FIGS. 6 to 8, wherein different turning conditions are illustrated.
Figure 13B:
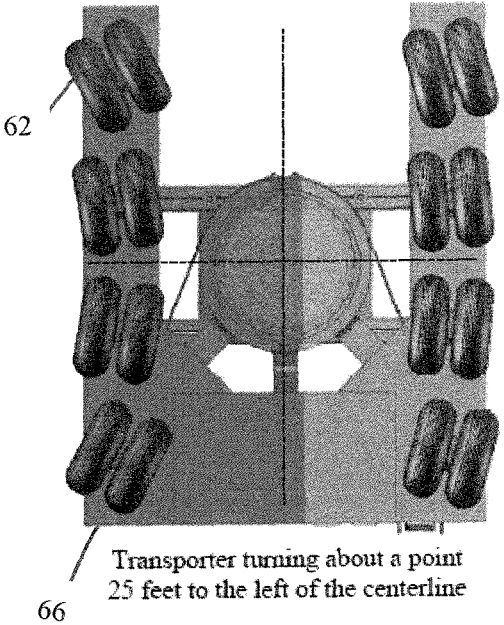
Figure 13C:
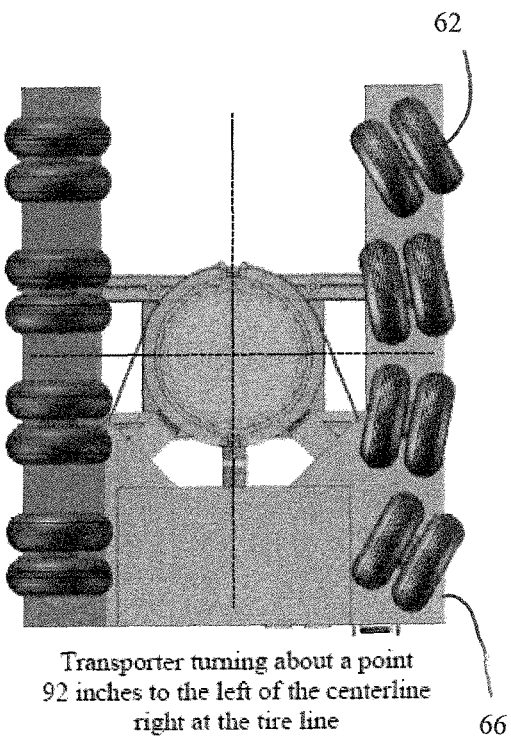
Figure 13D:
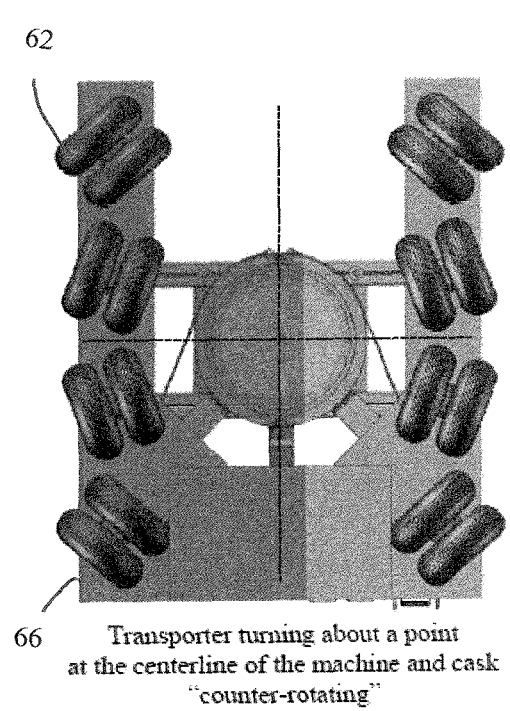

As best shown in FIGS. 6 to 8, the illustrated cask transporter 16 is a diesel/electric, self-propelled, wheeled vehicle that transports the storage cask 14 which weighs 125 tons. The illustrated cask transporter 16 includes sixteen wheels 62 which are driven by industrial hydraulic motors 64 with integral brakes for total control and greater flexibility. The illustrated cask transport 16 has four pairs of wheels 62 on each lateral side of the cask transporter 16. A diesel powered electric generator 36 provides power to operate the cask transporter 16. The cask transporter 16 preferably is designed to safely hold a TN32 cask 14 during a seismic event. A dynamic multiplier of 1.15 is preferably considered for impact loading during normal operations. Hydraulic fluids are preferably suitable for outdoor operation at 0 degree Fahrenheit and are preferably non-flammable with a flashpoint> or =100 degrees Fahrenheit. High pressure hydraulic lines are preferably secured and protected to prevent whipping in the unlikely event of failure. Hydraulic systems preferably carry the rated load, including a 15% hoist factor. Calculated safety margins for cylinder buckling and hoop stress are preferably a minimum of 2:1 versus the buckling load limit and the material yield strength respectively. The cask transporter 16 is sized and shaped so that it is stable to ensure that an upset will not occur during normal or off normal events.

The illustrated cask transporter 16 can shuttle loaded and unloaded storage casks 14 between the fuel handling hall 34 and any other accessible location at the site. The illustrated cask transporter 16 has a unique turning mechanism and wheel design allows significantly more maneuverability over prior systems. The cask transporter 16 preferably includes the following features: twenty year design life; all weather design; OSHA compliant design; auto-rotating, fully loaded on concrete or other hard surface; key start switch; switch type speed control; diesel fuel tank of about forty to fifty gallons; heaters (sump pump, fuel tank, and hydraulic reservoir); dead man controls (brakes applied upon release of control, loss of fluid pressure, or loss of power); traverse speed of 0.4 mph+/−0.05 mph on level ground; manual lowering capability without power; warning lights and audible alarm (30 foot range); provisions to prevent uncontrolled lowering; portable fire extinguisher; float battery charger; access ladders and fall protection; control panel capacity nameplate (rated load, empty weight, temperature limitations); ability to traverse two inch lip of obstructions at the site; durable outdoor paint system; and non-slip walkway surfaces.

The illustrated cask transporter 16 includes a body 66 which is the main weldment vehicle frame. The body 66 is the center structure that ties the entire machine together. It is constructed from welded plates and structural shapes. The body 66 serves as the mounting point for all other systems of the cask transporter 16 and also serves to support the cask 14. The body 66 is preferably a weldment constructed primarily from mild steel and structural shapes (ASTM A572 and A500C with yield strengths of 50,000 psi and welded per AWS D1.1). Welding complies with AWS D1.1. The structure is evaluated for both static and seismic load requirements.

As best shown in FIGS. 9 to 13, rubber tire propulsion/support systems of the illustrated cask transporter 16 include the wheels 62, rotation mechanisms 68, and hydraulic drive units 70. The illustrated eight pairs of dual-rubber wheels 62 (four pairs on each side and sixteen total wheels) are mounted on the underside of the body 66. The wheels 62 are preferably foam-filled aircraft tires such as those available from Michelin or equivalents that are designed for high capacities and high speeds. Because the cask transporter 16 is traveling at very low speeds, these wheels 62 are conservatively designed for this function. The foam-filled tires ensure that there is never a flat tire that could challenge the safety of the fuel assembly with a transported cask 14. Each dual tire set is driven by the hydraulic motor 64. Based on a dirt surface, a rotational speed of 3.056 rpm and 5% grade, each hydraulic motor 64 is approximately 5HP and is independently controlled by the PLC. Each dual wheel set is independently steered using commercially available rotary actuators 72. The rotary actuators 72 are used to pivot a joint where a conventional mounting proves impractical due to space, weight, or motion restrictions. These rack and pinion actuators 72 provide high torque output, zero leakage drift-free positioning, and excellent shock load resistance. These types of wheel sets are highly reliable. A control system provides the signals to drive, turn and rotate the wheels 62. Using a PLC that independently controls each of the dual wheel assemblies, the cask transporter 16 can turn as needed and drive around the entire site. The steering system provides the operator with the capacity to rotate the cask transporter 16 on itself, that is pivoting about its center (best shown in 13D).

Figure 14:
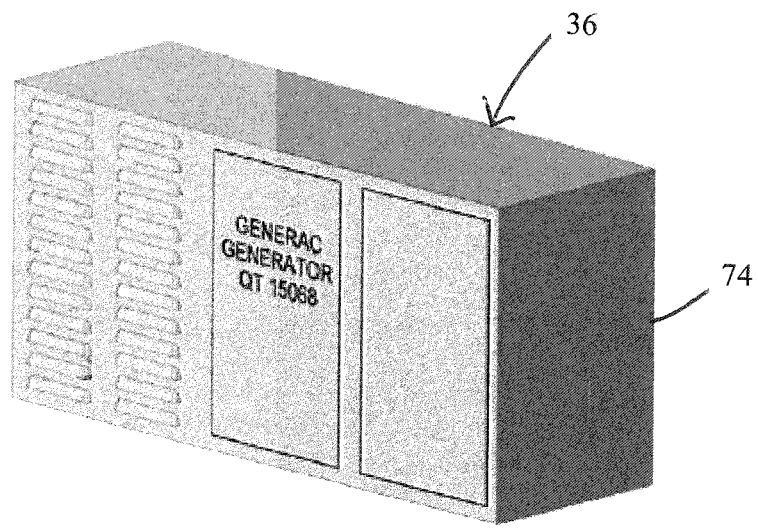
FIG. 14 is a perspective view of a diesel powered generator set of the cask transporter of FIGS. 6 to 8.

As best shown in FIG. 14, the illustrated cask transporter 16 includes the diesel powered generator 36 located at the rear of the body 66 to provide electrical power. The generator 16 includes a diesel engine, generator, diesel fuel tank, and all of the equipment to support the operation of the engine and generator and are all contained within a frame of a module 74. The engine and generator are sized to manage the most demanding function as limited by the control system. The diesel engine drives the generator, which is selected to provide 460V/3-phase/60 Hertz power to the cask transporter. This electricity powers and electric motor/hydraulic pump module for the lift function of the upender 26 and either another electric motor/hydraulic pump module for the propel function of the wheels 62 or two electric propel motors. Noise suppression systems are included with the system to reduce the dba levels workers are exposed to below OSHA limits. Operation of the cask transporter 16 requires that each function (propulsion, upending, etc.) be operated separately to maximize safety.

Figure 15:
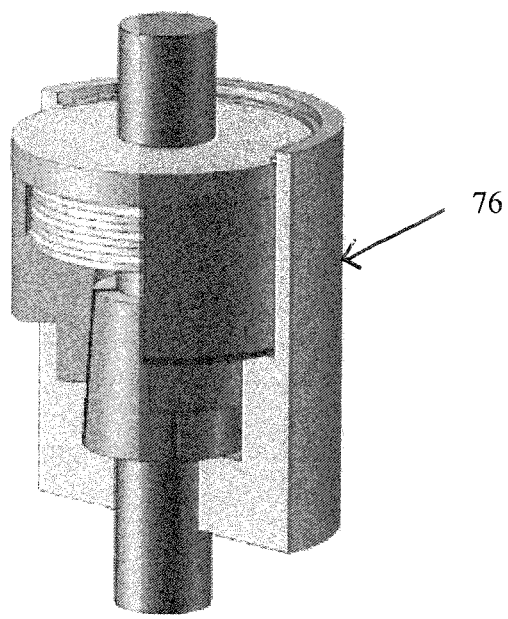
FIG. 15 is a perspective view of a safety catcher of a hydraulic lift system of the cask transporter of FIGS. 6 to 8.

As best shown in FIG. 15, the illustrated cask transporter 16 employs automatic drop protection to prevent uncontrolled lowering of the cask 14 during any system failure, such as loss of pressure to the cylinders or other catastrophic failure of the lifting system 26. The cask transporter 16 preferably is equipped with a separate safety system. This safety system holds the cask 14 in a safe condition in the unlikely event that a hydraulic cylinder fails or other structural parts of the lifting system 26 fail to function. Separately mounted from the hydraulic cylinder, the safety system employs two commercially available SITEMA safety catchers 76. Conventional locking devices fitted to the hydraulic presses (such as locking bolts or latches) often operate at the top, or a few more positions. Form fitting systems have a gap in safety between where power is disrupted and the hole slide hits a locking point. These obvious disadvantages are avoided by using SITEMA safety catchers 76. These safety catchers 76 prevent the cask 14 from crashing down at any stage of ascent or descent, are mechanically safe and reliable, and do not have a ratchet. A high safety standard, along with improvements in productivity, is achieved through: the load is supported on a holding shaft separate from the cylinder; the SITEMA safety catcher clamps without a ratchet, so that a safe clamping condition is attained throughout the entire stroke and a productively increase is offered as the actual stroke can be limited to the length that is absolutely necessary; the clamping system is held open by hydraulic or pneumatic means so that when pressure drops, the cask 14 is immediately secured; the energy of a falling or sinking load is used to generate the clamping force which only happens if the load starts to move downward from the secured position (when the safety catcher is without pressure). In this case, the cask 14 is securely stopped almost instantly with help of the self-intensifying clamp movement; and SITEMA braking operations are fully operational at all cylinder speeds and usually a deceleration of 1 to 3 g (acceleration due to gravity) is achieved and the resulting braking distance is not more than a few centimeters.

The illustrated cask transport 16 includes operator control system 78 including control panels and a generator module console. The operator control system is ergonomically mounted on the top deck 18 of the cask transporter 16 to provide user friendly operation from a swiveling operator's chair 82, in a location providing an unobstructed view of cask handling operations. Next to the operator's chair 82 is a stationary control console that has auxiliary indications. The operator's chair 82 can rotate approximately 270 degrees and automatically reverses the joy stick controls based on the orientation of the chair 82. The operator's control is provided with a protective cover to prevent weather damage. Hydraulics are operated by manipulation of solenoid valves that port fluid to extend and retract from commercially available hydraulic cylinders, such as those available from Parker. Counter-balance and pressure compensated flow valves ensure that the hydraulic system only operates when commanded, and is fail safe on the loss of pressure from leaks or pump failure. Operating pressure will be displayed on the stationary console plus additional warning lights for low hydraulic level and other fault conditions. The speed of the cask transporter 16 is controlled by a joy stick that is located on the operator's chair 82. Based on the position of the joystick, a 0-10 VDC signal is sent to a proportional valve that drives the eight hydraulic motors 64 either in forward or reverse. The joystick is spring-returned to neutral (0 position) to act as a dead-man switch. Steering is controlled by a multi-axis joystick that feeds a proportional signal though a PLC, such as those available from Allen Bradley, or equivalent that separately steers the eight pairs of wheels 62. The PLC program individually controls the wheels 62 so that they are rotated correctly based on their position on the cask transporter 16. Hydraulic fluid drives the eight rotary actuators 72, such as Parker HTR series hydraulic rotary actuators, with electronic feedback to properly position the wheels 62. A separate 75 HP motor drives a 28 gallon piston pump that is connected to a 80 gallon HPU reservoir for steering and propulsion. The tank comes with heat exchanger and heaters to accommodate any environmental extreme. Strainers and filters are preferably provided.

Controls for the cask transporter 16 are designed to be fail-safe, so that loss of power will shut down the system and prevent an uncontrolled movement of the cask 14. All safety interlocks and controls of the cask transporter 16 are hard wired between the specific relays, drives, circuit breakers, and other electrical equipment. The control system is designed per NEC standards and mounted within a minimum of NEMA 4 enclosures. Wiring is mounted in rigid conduit except for necessary flexible connections and at the interface between the conduit and the equipment. The cask transporter 16 is also grounded for personnel and equipment protection.

The upender 26 is powered by dual hydraulic brake-motors coupled top a planetary gear set to drive a pinion/bull gear ensemble. Encoders are integrated into each drive and set up as a master/slave configuration to ensure the upending is done in unison. Rotation is about a point approximately within three inches or about 80 centimeters of the center of gravity, therefore necessary power is kept to a minimum. In case of failure of one drive system, the other brake motor can hold the cask 14 by itself and can be driven to lower the cask 14 back down to a safe position. In addition, the fuel building crane can also be used to lower the cask 14 in case of a catastrophic failure. To prevent shock to the fuel assembly and cask 14, shock absorbers have been incorporated into the bed for safety. The upender 26 can be extended approximately forty inches or about one meter so that the cask 14 can be raised to the upper elevation at the cask preparation station 42. Dual eight inch double acting cylinders lift the cask 14 using non-flammable hydraulic fluid at a pressure of greater than 80% of the maximum operating pressure. Safety catchers 76 are incorporated into the cylinders so that a failure of a cylinder rod will nit be catastrophic. On loss of power, the cylinders can be manually lowered to put the cask 14 in a safe condition. When the cask 14 is on the upender 26, it is captivated in several locations. On the bottom of the cask 14, an "L" shaped platform 84 is hydraulically operated to latch the lower portion of the cask 14. This prevents the cask 14 from sliding and keeps the trunnions 56, 58 in their respective pockets in the bed. A second hydraulic assembly latches the rear upper trunnion 56 and prevents the cask 14 from tipping forward under even the worst anticipated seismic event. The locks fail safely in case of loss of power or loss of hydraulic fluid. On the bottom of the upender carriage is an alignment or guide tool or assembly. This hydraulically activated alignment assembly lowers onto the rails 40 that are embedded in the floor of the fuel hall 34 to guide the cask transporter 16 in precise alignment. This assembly is only a guide and does not have driven wheels. A single hydraulic cylinder is used to raise (store) and lower (engage) the assembly.

At the first or cask prep station 42, the cask 14 is moved to the vertical position. The cask transporter 16 aligns the cask 14 with the hole 44 in the ceiling of the fuel hall 34 and the fuel building crane is used to perform cask component removal/replacement work. The cask 14 is positioned so that the crane can take each lid out of the cask 14, bring it up through the hole 44 and place it on a rolling shelf. Operators can easily access the top of the cask 14 to remove bolts and prepare the cask for insertion of the fuel assemblies.

After the biological lid's bolts are removed, the cask 14 proceeds to the second or biological lid station 46 to have the biological lid removed and the seals inspected. Using the Hevi-Lift Hoist 48 or the equivalent mounted onto a bridge and trolley assembly, a grapple can be maneuvered to attach to the biological lid and remove it from the cask 14. The Hevi-Lift Hoist 48 is a 7.5 to 10 ton unit that has multiple single failure proof components in order that the lid cannot be dropped onto spent fuel. The hoist 48 has multiple brakes (CD brake, load brake and regenerative braking) coupled with a duel rope system to ensure that the breakage of rope will not drop the load. The hoist 48 is operated with a variable frequency drive, such as a Smartorque drive, or equivalent for precise positioning. The bridge and trolley are very short spans providing approximately one foot (or about 0.3 meters) of travel in the X and Y plane. The bridge and trolley are over sized to allow for a 10:1 design factor based on ultimate strength and are operated using a standard starter and relay rather than VFD. The grapple is designed to meet the requirements of ASME N14.6-1993, "Special Lifting Devices for Shipping Containers Weighing 10,000 pounds or More" and ASME BTH-1, "Design of Below the Hook Lifting Devices". The grapple is designed to interface with the round lug on the top of the geological shield. The device has jaws that meet the standard configuration profile. The jaws of the grapple pass through the opening (ID) in the canister lifting lug and come to rest on the top of the lid. As the weight of the grapple shifts from being held by the hoist due to being carried by the lid, the linkage of the system of the grapple moves downward and disengages the mechanical latch. The mechanical latch works by using a T-shaped rod and cam profile that has the ability to move up and down, and to rotate. Similar to operating a ball point pen, the cam mechanism in the latch alternates from extending and retracting the T-shaped rod. When the grapple travels downward, it activates the latch to move the wedge configuration to drive the jaws outward until full stroke is obtained (approximately 2 inches). Once the grapple is attached to the lug, it is mechanically locked and cannot open as a result of operator error. This is efficient because the mechanical principle of wedges (incline planes) gives a mechanical advantage based on the weight of the load lifted. The jaws cannot disengage while lifting the load. When disengaging the cask, the reverse sequence occurs. On the downward motion of the grapple, the weight of the unit applies a vertical force on a linage series which in turn applies a horizontal force to retract the jaws. This all occurs simultaneously leaving the jaws retracted and the grapple in the unlatched position. The grapple can then be lifted free of the lid.

Figure 16:
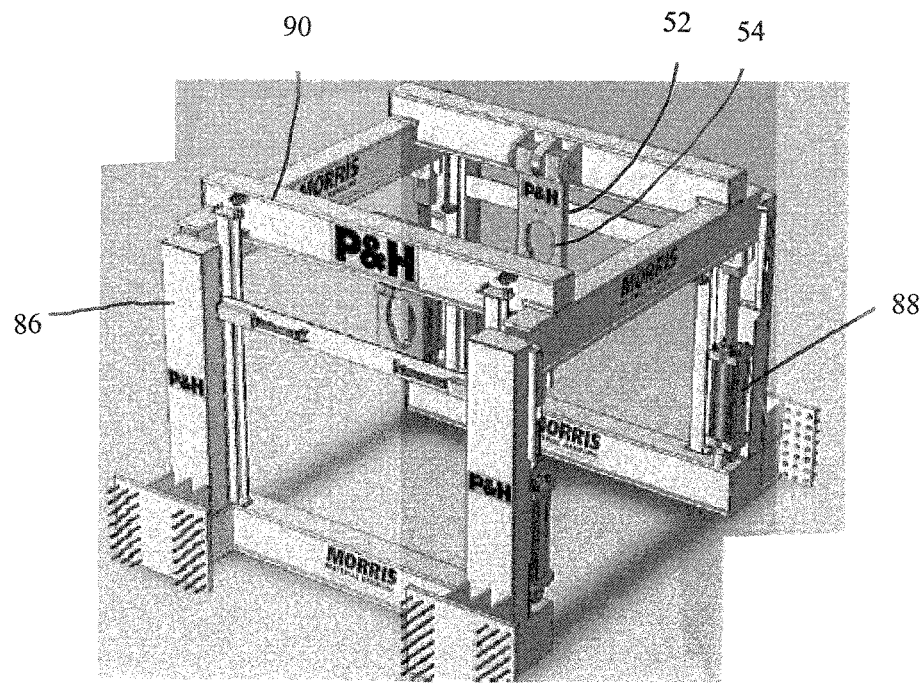
FIG. 16 is a perspective view of an upper cask handling station of the cask handling system of FIGS. 1 to 5.

Once the biological lid has been removed, the cask transporter 16 moves the cask 14 to the third or upper cask handling station 50 where the cask 14 is positioned against a penetration seal. As best shown in FIG. 16, the upper cask handling station 18 includes a weldment 86 that has four hydraulic cylinders 88 that raise and lower the cask engagement tool 90. The cask engagement tool 90 includes the two pivoting paddles 52 with the key slots 54 that fit over the upper trunnions 56 on the side of the cask 14. With the cask 14 aligned under the upper cask handling station 18, the ten inch diameter cylinders 88 lower the paddles 52, and an electro-mechanical actuator pivots the paddles 52 down about their horizontal pivot axes and over the trunnions 56. The cylinders 88 then rise slightly to ensure proper fit and take some initial cask load. The cask 14 is disengaged from the cask transporter 16, which backs away from the cask 14. With the entire cask 14 suspended from the upper cask handling station 18, the cylinders 88 raise the cask 14 into the penetration seal. The cylinders 88 rise together based on a linear encoder in each rod that feeds back to the control system to ensure proper alignment. In addition to the linear encoders, the upper cask handling system 18 ensures proper alignment with guide tubes that are positioned at each of the four corners. Gravity ensures the cask 14 hangs straight down since the round trunnions 56 seated in the round key slots 54. As the cask 14 is raised, it interfaces with a stainless steel penetration lower flange that has a multi-level seal system. Once the cask 14 is seated, the seals are filled with air to seal the interface between the penetration lower flange and the cask 14 so that there is no leakage even with the pressure resulting from a significant water column. In between the seals are leak detection sensors that provide assurance that the main and backup seals are tight. With the cask 14 properly seated, tapered shear pins are inserted between the stationary structure and the lift frame 18 to lock the cask 14 in place. This provides assurance that even during a seismic event, the cask 14 will not become disengaged from the penetration seal.

Figure 17:
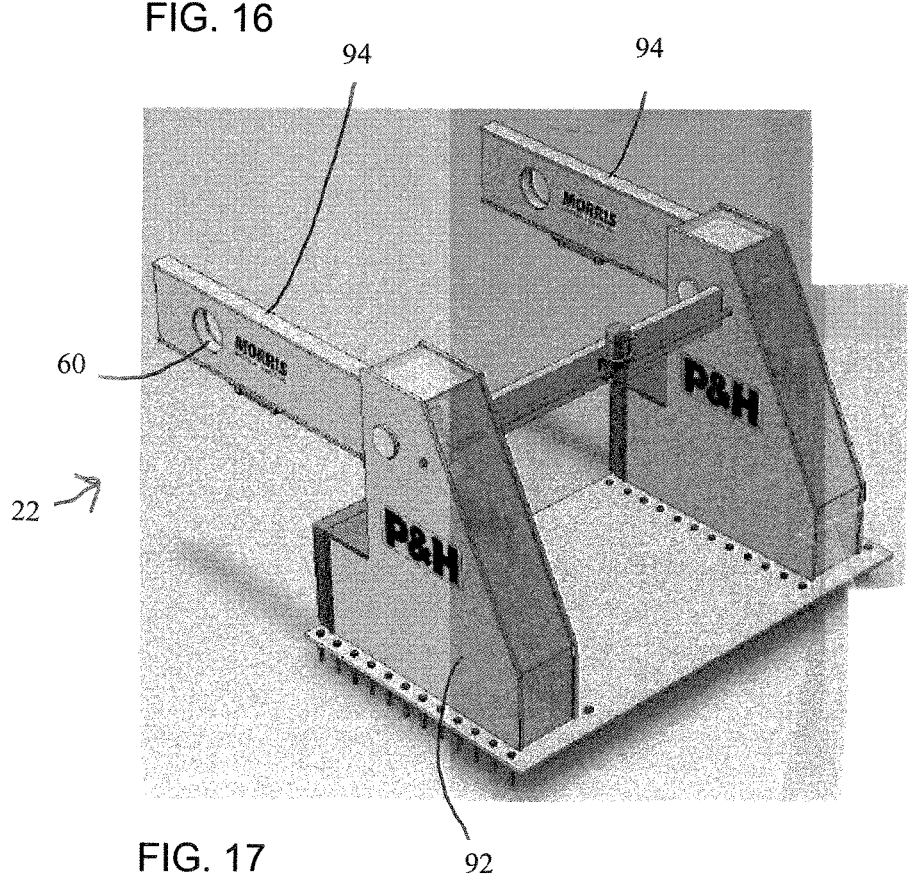
FIG. 17 is a perspective view of a lower seismic restraint of the cask handling system of FIGS. 1 to 5.

Once the cask 14 has been raised and seated on the penetration seal, the lower seismic restraint 22 engages the lower trunnions 58 of the cask 14 to securely hold the assembly. This carbon steel weldment 92 is mounted permanently to the floor in the fuel hall 34 below the penetration 32. As best shown in FIG. 17, the seismic restraint 22 includes two horizontally moving arms 94 that extend out at the height of the trunnions 58. The cask transporter 16 straddles the lower seismic restraint 22 when it delivers the cask 14. After the cask transporter 16 has released the cask 14 and backed out of the way, the restraint 22 actuates to engage the trunnions 58 using an ACME screw to bring the arms 94 over the trunnions 58. A separate locking plate operated by a mechanical-electrical actuator locks both arms to the cask 14 so the unit can handle seismic forces in all three planes. Once the cask 14 is filled with fuel assemblies, the lower seismic restraint 22 releases the cask 14 by shifting locks and retracting the arms 94 from the cask 14. The cask 14 can then be lowered onto the cask transporter 16 and the loaded cask 14 can be removed from the fuel hall 34.

Figure 18:
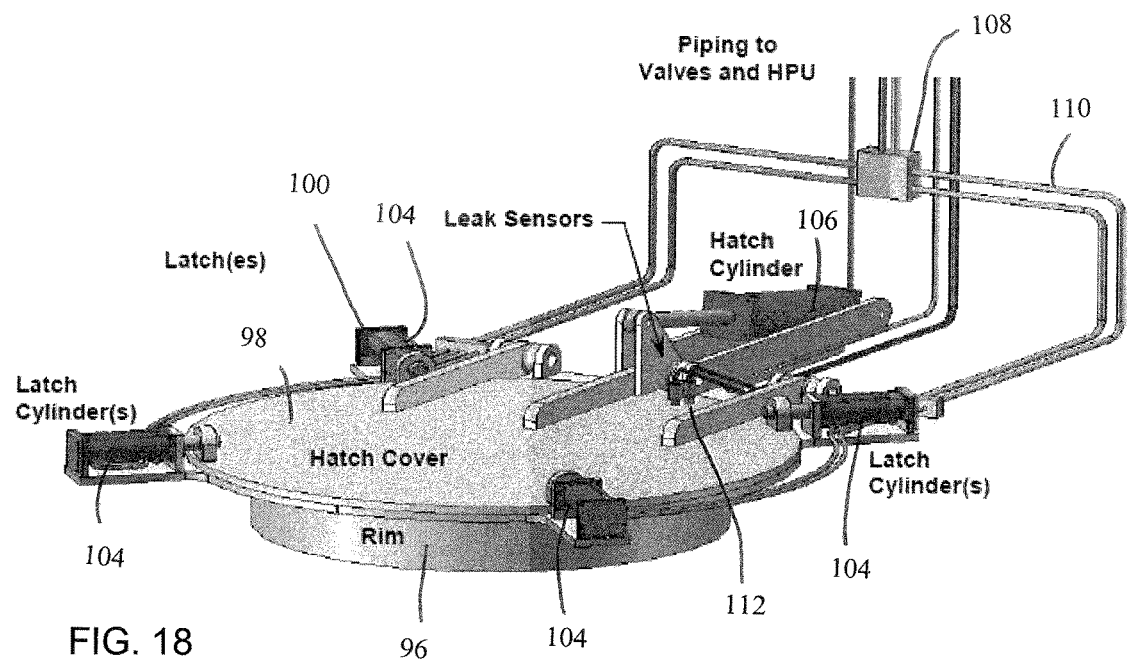
FIG. 18 is a perspective view of a penetration upper hatch of the cask handling system of FIGS. 1 to 5, wherein a hatch cover is closed.
Figure 19:
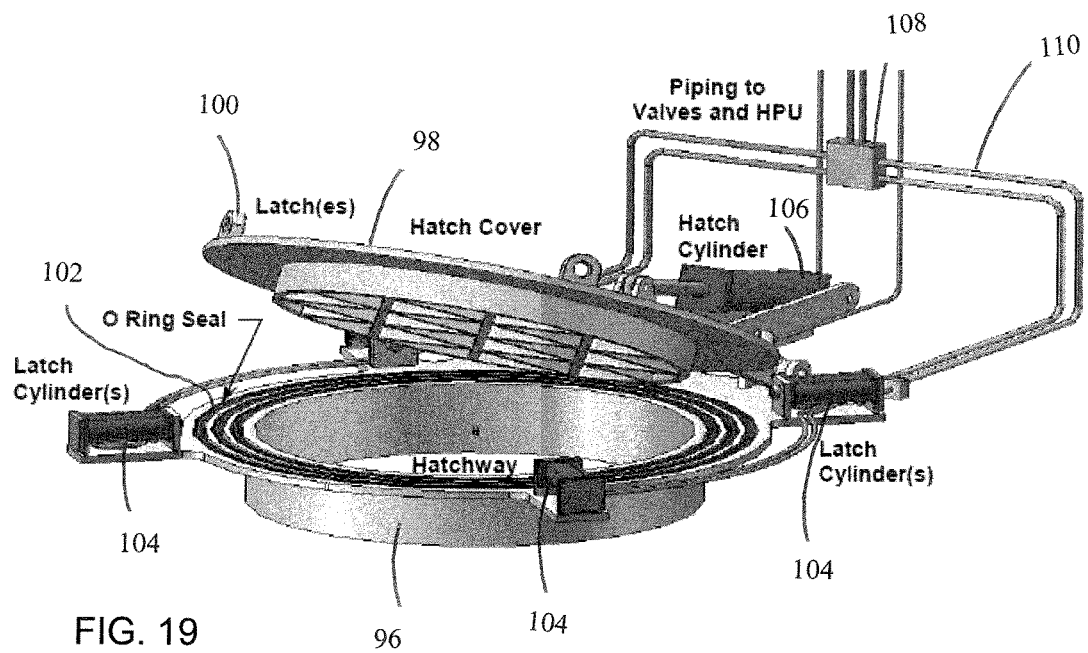
FIG. 19 is a perspective view of a penetration upper hatch of FIG. 18, wherein the hatch cover is partially open.
Figure 20:
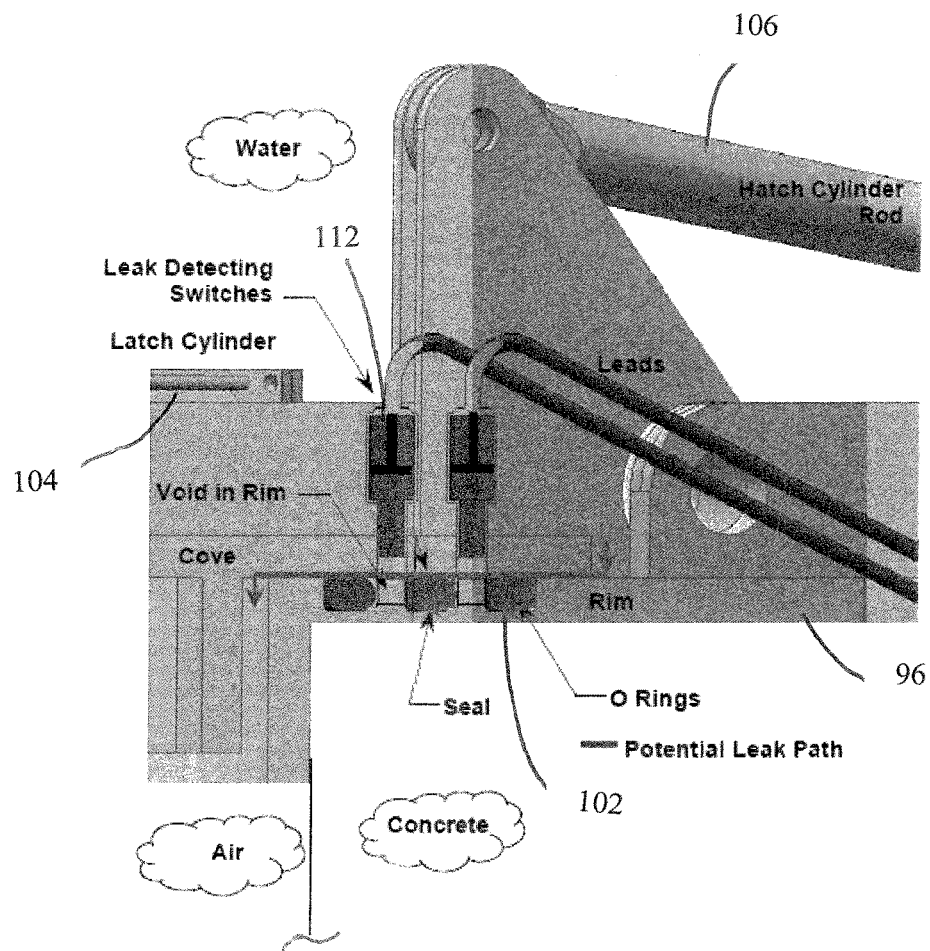
FIG. 20 is an enlarged fragmented view of a portion of the penetration upper hatch of FIGS. 18 and 19.

As best shown in FIGS. 18 to 20, the penetration upper hatch or cover 20 includes a rim 96, a cover 98 with latches 100, o-rings 102, latch cylinders 104, a hatch cylinder 106, a hydraulic power unit 108, piping 110, and leak sensors 112. The rim 96 is a stainless steel weldment sized to fit the hole at the upper penetration 32. It houses the o-ring seals 102, provides a base for installation of the hatch cylinder 106 and the latch cylinders 104, and offers a pivot for the cover 98. The cover 98 is a stainless steel weldment. It mates with the rim 96 at the pivot points, through the hatch cylinder 106, through the latch cylinders 104, and at the o-ring seals 102 where it provides sealing. The o-rings 102 are fabricated o-rings of about a 1.0 inch cross section. The o-rings 102 are fabricated to three different diameters to provide three concentric sealing surfaces. Material is compatible with the water of the spent fuel building and a high radiation application. The latch cylinders 104 are stainless steel water hydraulic cylinders of 3.25 inch bore and 3.5 inch active stroke. They are front flange mounted and rear flange retrained to decrease deflection when operating. The rod is 2.0 inches in diameter with a ¾×15 degree end taper. This taper forces the cover tight against the o-ring seals providing a positive seal. The hatch cylinder 106 is a stainless steel water hydraulic cylinder of 4.0 inch bore, 16.0 inch active stroke, and 1.5 inch diameter rod. It is mounted to the rim 96 at its base end and to the cover 98 at its rod end providing the force to open and close the cover 98. The hydraulic power unit (HPU) 108 is a motor driven water hydraulic pump which provides flow and pressure to operate the cylinders 104, 106. It incorporates water hydraulic valves to operate the latch cylinders 104 or the hatch cylinder 106. Piping 110 to the cylinders 104, 106 is stainless steel tubing fabricated to the dimensions of the SFB transferring flow and pressure from the HPU 108 to the cylinders 104, 106. The leak sensors 112 are switches which provide a signal to the system when sensing a leak through the o-rings 102.

Operation of the penetration upper hatch cover 20 begins with the cover 98 closed and locked. When it is desired to open the cover 98, the operator activates the valve operating the latch cylinders 104. These cylinders 104 retract, pulling their rods (pins) from the cover latches 100. Sensors confirm when the cover is unlatched. The operator then activates the hatch cylinder 106. This cylinder 106 pulls on the cover lever and opens the cover 98. The cover rotates from zero degrees through about 105 degrees at full open. Sensors confirm that the cover is fully open and the penetration 20 is ready for passage of the fuel assemblies. Fuel is passed through the penetration 20 until the spent fuel cask 14 is full, and must be removed. To close the penetration 20, the operator activates the hatch cylinder 106 to close the cover 98. The cylinder 106 moves the lid 98 until the CG is past center and then restrains the lid 98 as it lowers down onto the o-ring seals 102 of the rim 96. A hatch cylinder pin may be manually pulled to allow the cover 98 to close in an emergency. The illustrated embodiment has three o-rings 102 arranged circumferentially about the hatch opening. These o-rings 102 seal on their tops and bottoms against the cover 98 and the rim 96. The operator activates the latch cylinders 104 which drive their tapered rods (pins) into the latches 100 of the cover 98. This taper further forces the lid 98 tight against the o-rings 102 ensuring their complete seal. Sensors indicate when the latches 100 are fully engaged. Since there is no residual force attempting to release the latch cylinders 104, the lid 98 will remain closed and sealed during any unforeseen conditions. Hand pumps can release the latches 100 during emergency situations.

Figure 21:
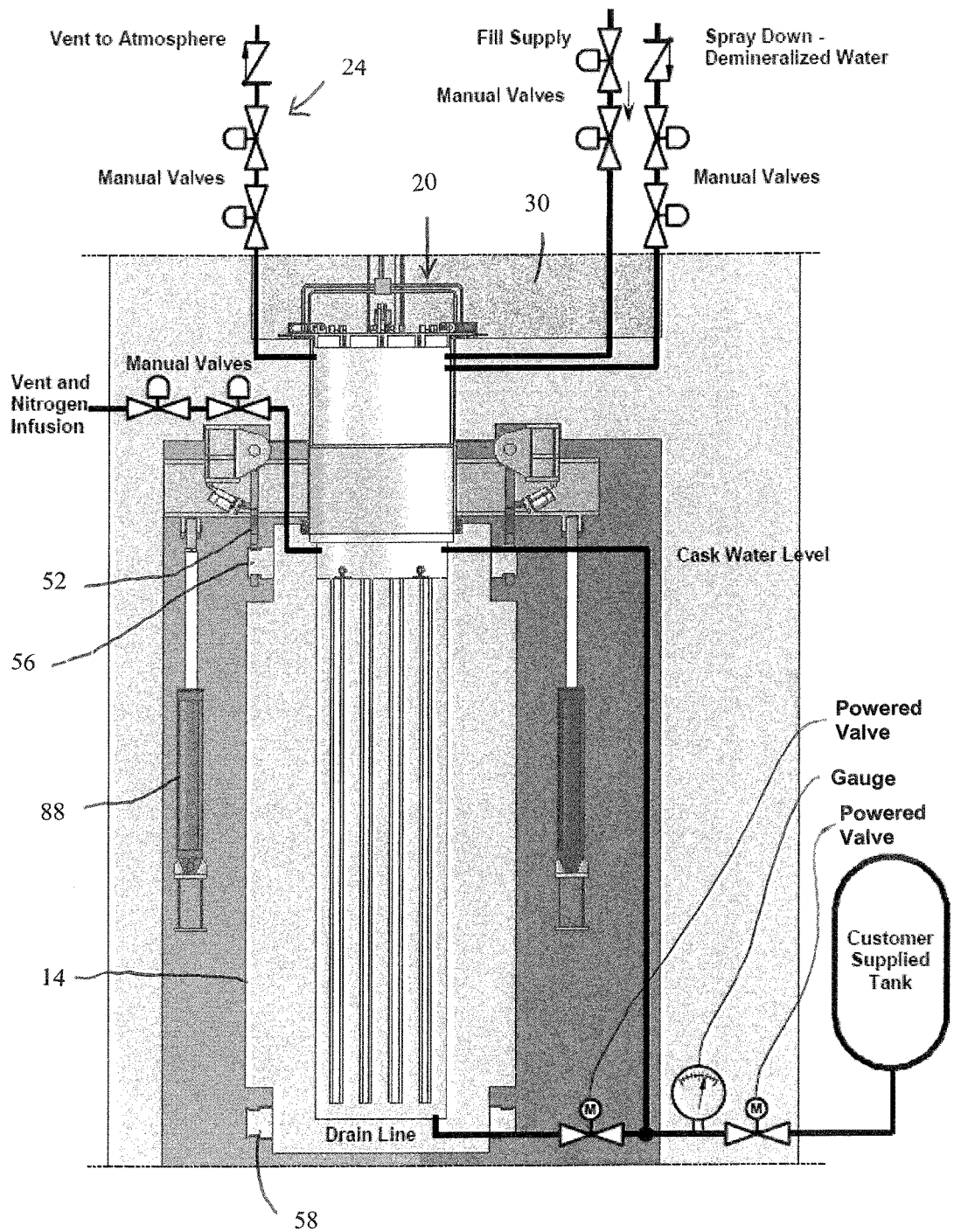
FIG. 21 is a schematic view of piping in a cask handling room of the cask handling system of FIGS. 1 to 5.

FIG. 21 illustrates piping of the cask handling room 50. The piping system includes valves for filling the cask 14 including venting, valves to spray down the annulus and cask 14 with de-mineralized water, and a pressure gauge and level indicator for the cask 14. Double valves are provided so that a failed unit can be isolated. Most of the valves are manual and located outside the fuel hall 34. Those valves and gauges inside the fuel hall 34 that are not accessible when personnel are not allowed in the vicinity are electrically operated.

Figure 22:
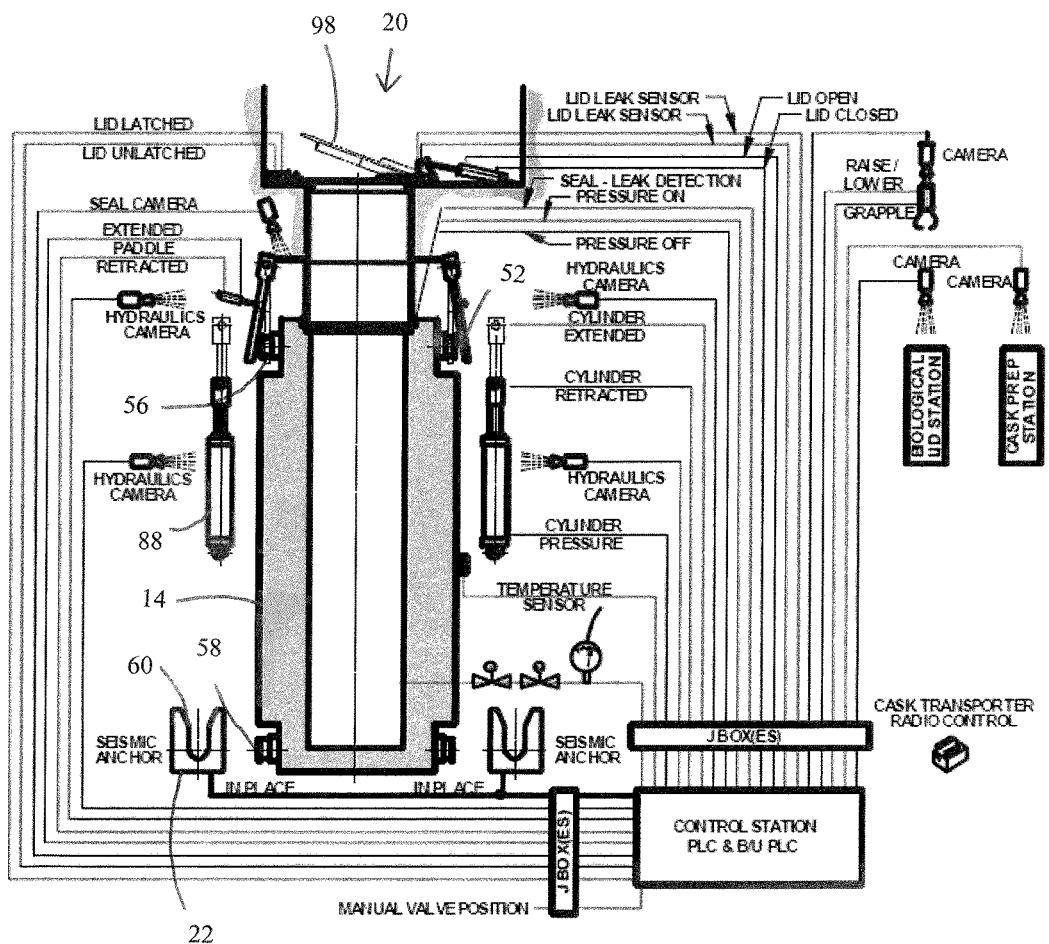
FIG. 22 is an electrical schematic view of a control system of the cask handling system of FIGS. 1 to 5.

FIG. 22 is an electrical schematic of the control system of the cask handling system 12. The cask handling system control is housed in a floor mounted NEMA 12 enclosure/main control console. The enclosure/main control console contains two PLCs, an operator interface and all video camera controls with LED flat screen monitors. The control system employs two independent PLCs. The first PLC is an Allan Bradley ControLogix PLC or the equivalent and is dedicated to the control and operation of the cask handling system 12. The second PLC is an Alan Bradley dual processor GuardLogic PLC or the equivalent and is used for monitoring all safety related devices and functions. This PLC, when used with safety I/O blocks is safety certified SIL-3 per IEC 61508. Both PLC processors will communicate over an Ethernet/IP network. The operator interface consists of an Allan Bradley Panelview Plus LED touch screen monitor or the equivalent that is in direct communication with the operational PLC over an Ethernet/IP network. This interface is programmed with various operator control screens as well as screens for operational interlocks, fault messages, and troubleshooting aids. All motion is interlocked in the PLC program to assure all operations are performed in the proper sequence. A hard wired safety emergency stop pushbutton is located at each of the three working stations as well as at the remote main control console. When any of the emergency stop buttons are pressed, all motion relating to the cask handling system will stop. The camera system will consist of several strategically placed video cameras for monitoring various cask loading operations and overall cask handling status. Where necessary, cameras will be radiation hardened and incorporate a pan/tilt/zoom feature. Camera joystick controls along with the associated flat panel color viewing monitors are located at the remote man control console. Once inside the fuel hall, the cask transporter is powered via a plugged in power cable and control and control of the cask transporter will be accomplished by means of a control chief radio remote control box. In addition, the main control console PLC will monitor various functions of the on board cask transporter PLC over a connected network communication cable.

It is apparent from the above disclosure that the improved cask handling system 12 utilizes a number of innovations to reduce the time to perform the task and significantly reduces the number of components. The sealing process where the cask 12 is interfaced to the spent fuel pool is simplified to allow gravity to help align the system to prevent any leakage. The self-powered mobile cask handling vehicle 16 handles the cask 14 at a number of stations and transports the casks 14 throughout the site.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A method for removing spent nuclear fuel from a fuel pool comprising the steps of:
    moving a cask below a handling mechanism that is at a fixed position below a penetration of the fuel pool using a transporter while a cover of the penetration is closed;
    raising the cask off of the transporter using the handling mechanism;
    securing the cask to the penetration while the cask is supported by the handling mechanism;
    moving the transporter away from the cask and the handling mechanism after the cask is raised off of the transporter by the handling mechanism;
    while the cask is sealed to the penetration, opening the cover of the penetration;
    inserting the spent fuel into the cask;
    after the spent fuel is inserted into the cask, unsealing the cask from the penetration;
    moving the transporter back below the cask and the handling mechanism and lowering the cask loaded with the spent fuel onto the transporter using the handling mechanism; and
    moving the transporter with the cask loaded with the spent fuel away from the penetration and the handling mechanism.

2. The method according to claim 1, wherein the step of raising the cask from the transporter includes the steps of engaging upper trunnions of the cask with pivoting paddles of the handling mechanism.

3. The method according to claim 2, wherein the pivoting paddles have key-holes receiving the upper trunnions.

4. The method according to claim 1, wherein the handling mechanism comprises:
    a fixed position frame configured to permit the transporter to move thereunder while supporting the cask;
    a cask engagement tool movable in the vertical direction relative to the frame and configured to selectively move the spent nuclear fuel cask in the vertical direction relative to the frame when the cask is secured to the cask engagement tool to selectively raise and lower the cask onto and off of the transporter;
    a plurality of hydraulic cylinders extending between the frame and the cask engagement tool and configured to move together for raising and lowering the cask engagement tool relative to the frame; and
    a pair of paddles carried by the cask engagement tool and pivotably attached to the cask engagement tool for selectively engaging upper trunnions of the cask; and
    an actuator for selectively pivoting the pair of paddles into and out of engagement with the upper trunnions of the cask.

5. The method according to claim 4, wherein the paddles have keyholes for receiving the upper trunnions.

6. The method according to claim 4, wherein the frame is secured below a penetration of a fuel pool.

7. The method according to claim 4, wherein the frame is secured below the penetration of the fuel pool.

8. The method according to claim 4, wherein the cask engagement tool linearly moves in the vertical direction relative to the frame.

9. The method according to claim 4, wherein the linear actuators linearly raise and lower the cask engagement tool relative to the frame.

10. The method according to claim 4, wherein the handling mechanism is configured to engage only upper trunnions of the cask.

11. The method according to claim 1, wherein the transporter is self-powered vehicle.

12. The method according to claim 11, wherein the transporter is guided by rails near the penetration.

13. The method according to claim 11, wherein the self-powered vehicle comprises
    a body;
    an upender secured to the body for holding the cask and moving the cask between vertical and horizontal orientations;
    a plurality of independently driven and independently steered duel wheel sets on each lateral side of the body;
    a plurality of drive motors for driving the plurality of duel wheel sets;
    a plurality of rotary actuators for steering the plurality of duel wheel sets; and
    a diesel-engine driven electric generator carried by the body for producing electric power to selectively move the upender structure, to selectively drive each of the duel wheel sets, and to selectively steer each of the duel wheel sets.

14. The vehicle according to claim 13, wherein each of the duel wheel sets includes a pair of coaxial wheels, one of the plurality of drive motors is located between the pair of wheels and coaxial with the pair of wheels, one of the plurality of rotary actuators is located above the drive motor and having a vertical axis of rotation for selectively rotating the pair of wheels, and the drive motor located between the pair of wheels.

15. The method according to claim 13, wherein the plurality of drive motors is a plurality of hydraulic motors.

16. The method according to claim 13, wherein the plurality of rotary actuators is a plurality of rack and pinion actuators.

17. The method according to claim 13, wherein the plurality of duel wheel sets includes four duel wheel sets on each lateral side of the body.

18. The method according to claim 1, further comprising the step of filling the cask with water while the cask is supported by the handling mechanism to equalize pressure with water within the fuel pool prior to the step of opening the penetration cover.

19. The method according to claim 1, after the step of moving the transporter away from the cask and the handling mechanism after the cask is raised off of the transporter by the handling mechanism, further comprising the step of engaging lower trunnions of the cask with a keyed structure of a seismic restraint to prevent swinging motion of the cask in a seismic event.

\* \* \* \* \*